United States Patent [19]
Lee

[11] Patent Number: 5,440,836
[45] Date of Patent: Aug. 15, 1995

[54] HYDROPONIC DEVICE FOR PLANT CULTIVATION

[76] Inventor: Jong-Chul Lee, 447-27, Sutak-Dong, Suli-Si,, Kungki-Do, Rep. of Korea

[21] Appl. No.: 213,949

[22] Filed: Mar. 16, 1994

[30] Foreign Application Priority Data

Mar. 16, 1993 [KR] Rep. of Korea ............. 93-3952
Feb. 1, 1994 [KR] Rep. of Korea ............. 94-1836

[51] Int. Cl.6 .......................................... A01G 31/06
[52] U.S. Cl. .......................................... 47/60; 47/58; 47/59; 47/62; 47/1.01
[58] Field of Search ............. 47/58, 59, 79, 60, 62, 47/65, 1.01, DIG. 3

[56] References Cited

U.S. PATENT DOCUMENTS 4,756,120  7/1988  Arledge .................. 47/59

FOREIGN PATENT DOCUMENTS 473279  10/1937  United Kingdom .

Primary Examiner—David T. Fox
Assistant Examiner—Elizabeth F. McElwain
Attorney, Agent, or Firm—Harvey Kaye; Jerry Cohen

[57] ABSTRACT

A hydroponic device comprises a reservoir for containing culture fluid therein, one or more cultivation beds placed on the reservoir one above the other, a conduit extending vertically upwardly from the reservoir up to an uppermost cultivation bed and a fluid pump mounted on the reservoir for forcedly feeding the culture fluid to the uppermost cultivation bed through the conduit. Each of the beds includes a basin-like body which is provided with a bottom wall and an inclined side wall, the side wall having a plurality of fluid outlet holes. A canted support flange extends downwardly outwardly frame the side wall of the basin-like body. The support flange has a plurality of plant holding apertures, each of which is arranged to receive the culture fluid issued through the corresponding fluid outlet holes.

7 Claims, 4 Drawing Sheets

HYDROPONIC DEVICE FOR PLANT CULTIVATION

FIELD OF THE INVENTION

The present invention is concerned with a hydroponic device for plant cultivation and, more particularly to a multistory water culture bed arrangement adapted to grow plants through the use of circulative culture solution.

DESCRIPTION OF THE PRIOR ART

As is well-known in the art, hydroponic or agriculture devices are designed to grow various plants, e.g., foliage plant or esculent plant by way of forcedly circulating culture solution, without having to use any soft or earth. A typical hydroponic device includes a cultivation bed for anchoring plant seeds or young plants in place and an electrically operated fluid pump for feeding culture solution to the plant seeds to germinate them. The culture solution may contain such nutritive substances as chemical fertilizer to increase the growth ram of the plants implanted on the cultivation bed.

Japanese Utility Model Publication No. 88-5465 published on Feb. 15, 1988 discloses a hydroponic cultivation apparatus cmprising a framework having a front, inclined wall and a bottom reservoir, a plurality of plant cultivation pockets provided on the front wall at a different elevation from one another, a plurality of fluid receiver dishes for receiving culture fluid dropped from the corresponding cultivation pocket to relay it to the next cultivation pocket positioned just there below and a fluid pump far delivering the culture fluid from the bottom reservoir up to the top cultivation pocket.

The above-referenced and other prior art hydroponic devices require a large capacity fluid pump to supply a sufficient amount of culture solution to the plants implanted on each of the cultivation pockets, mainly because a substantial portion of the so supplied culture solution is dropped directly from the cultivation pockets to the bottom reservoir. In addition, the culture solution tends to cream noisy sound as it falls down on the reservoir.

Another disadvantage of the conventional hydroponic cultivation system may be that the plant implantation area is limited to the front side and the top of the cultivation bed, thereby leaving the rear and the flank sides useless.

Furthermore, not only the known hydroponic device is bulky in structure but also it fails to make its overall height adjustable, depending on the user's choice and preference.

SUMMARY OF THE INVENTION

Accordingly, it is an object of the invention to provide a multistory bydroponic device which is structurally compact and height-adjustable in a ready and convenient manner.

Another object of the invention is to provide a multistory hydroponic device that makes it possible to use all sides of a cultivation bed as a plant growing area.

A further object of the invention is to provide a multistory hydroponic device capable of reducing the capacity of a fluid pump required in circulating the culture solution In accordance with the present invention, there is provided a hydroponic device adapted to grow plants through the use of circulative culture fluid, comprising: a reservoir placed at a lowermost position of the hydroponic device for containing the culture fluid therein; one or more cultivation beds lying on the reservoir one above the other, each of the beds including a basin-like body which is provided with a horizontally extending bottom wall and an inclined side wall, extends upwardly outwardly from the bottom wall, the side wall having a plurality of fluid outlet holes each arranged at such an elevation as to permit the culture fluid gathered in the body to overflow therethrough; each of the cultivation beds further including a canted support flange which extends downwardly outwardly from the side wall of the body, the flange having a plurality of plant holding apertures each capable of anchoring the plants in place, the fluid outlet holes being at a position of the side wall such that the culture fluid issued therethrough can flow down along the support flange to reach the corresponding plant holding apertures; a conduit extending vertically upwardly from the reservoir through the bottom wall of the basin-like body up to an uppermost cultivation bed; and a fluid pump mounted on the reservoir for forcedly feeding the culture fluid to the uppermost cultivation bed through the conduit.

BRIEF DESCRIPTION OF THE DRAWINGS

These and other objects of the invention will become more apparent when a preferred embodiment of this invention is considered in connection with the drawings, in which.

DETAILED DESCRIPTION OF THE PREFERRED EMBODIMENT

Figure 1:
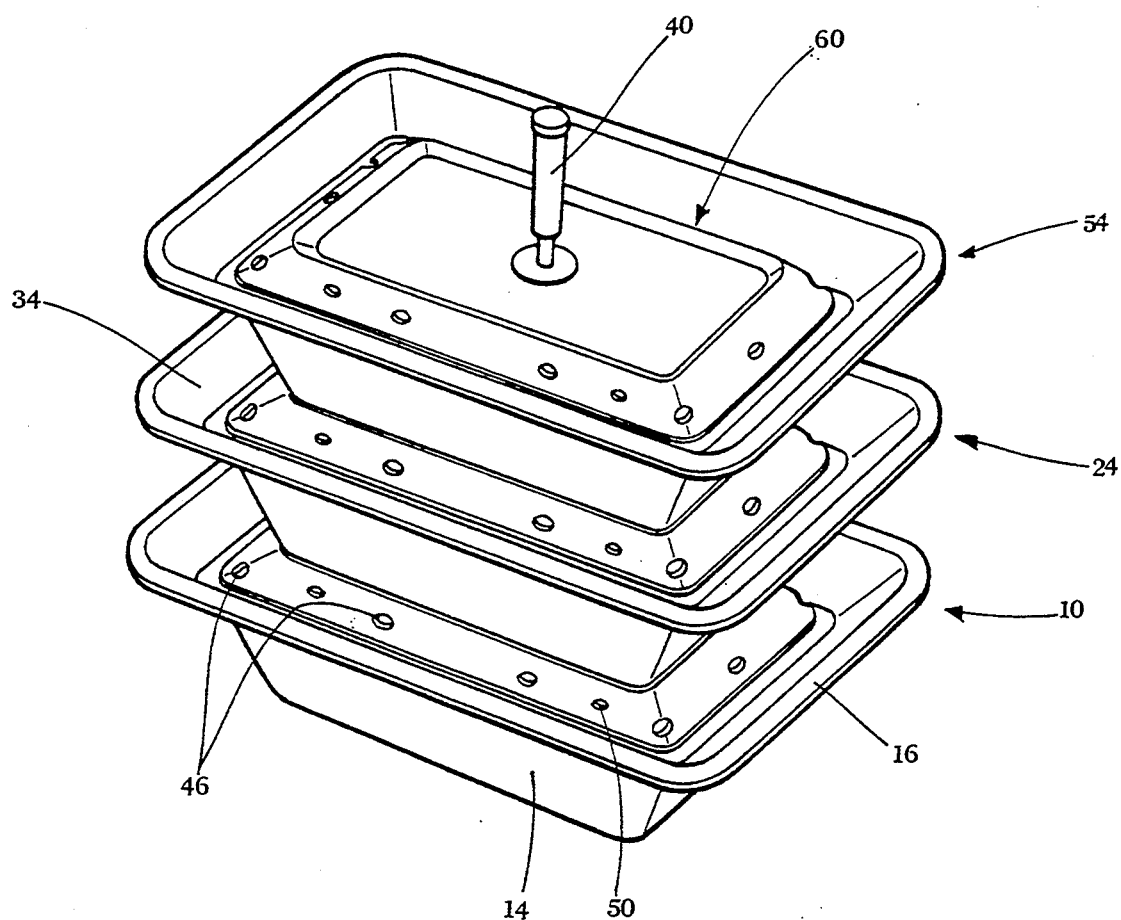
FIG. 1 is a perspective view of the multistory hydroponic device made in accordance with one embodiment of the present invention.
Figure 2:
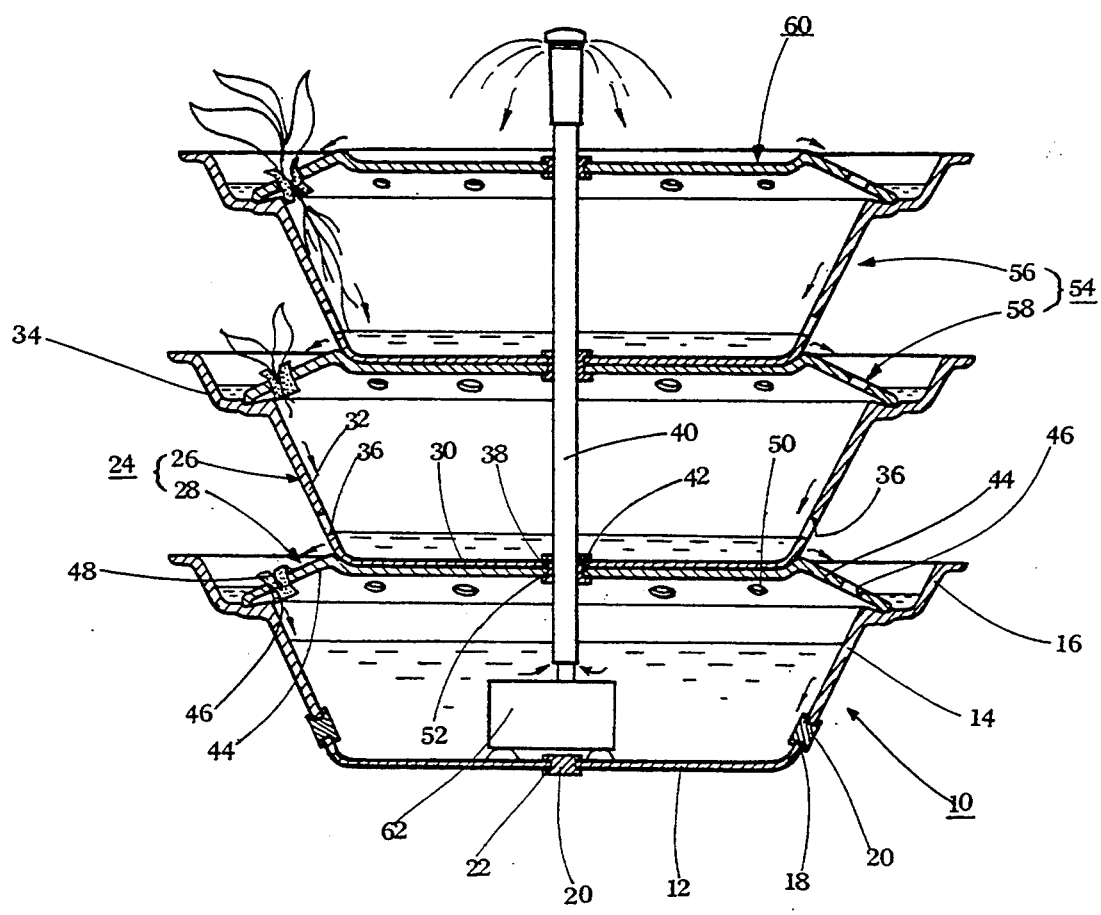
FIG. 2 is a cross-sectional view of the hydroponic device shown in FIG. 1.

Referring collectively to FIGS. 1 and 2, it can be seen that the hydroponic device embodying the present invention comprises a reservoir 10 placed at a bottom position of the device. The reservoir 10 is designed to hold a sufficient amount of culture fluid or solution which may preferably contain nutritive substances, e.g., chemical fertilizer.

It is preferred that the reservoir 10 includes a horizontal bottom wall 12 and a sloped side wall 14 extruding upwardly outwardly from the bottom wall 12. The side wall 14 terminates at a flared rim 16 and may have a fluid outlet hole 18 tightly sealed by a robber plug 20. Likewise, the bottom wall 12 may be provided with a central through-hole 22 also sealed by the rubber plug 20 which serves to prevent any leakage of the culture fluid contained in the reservoir 10. The reason for constructing the reservoir 10 in such a rather complicated structure is that the reservoir 10 may have the same geometry or configuration as that of the basin-like body of a cultivation bed set forth below, thereby ensuring mass production of the reservoir and the cultivation bed with a single mold. If desired, the reservoir 10 may have any other suitable shape than depicted in FIGS. 1 and 2.

Lying immediately above the reservoir 10 is a first cultivation bed 24 which consists of a basin-like body 26 and a support flange member 28. As with the reservoir 10 described above, the basin-like body 26 includes a horizontal bottom wall 30 and a sloped side wall 32 extending upwardly outwardly from the bottom wall 30. The side wall 32 is provided with a flared rim 34 at its peripheral edge and has a fluid outlet holes 36 formed nearer to the bottom wall 30 than the flared rim 34. The elevation of the fluid outlet holes 36 is such that the culture fluid may overflow therethrough as the fluid reaches a predetermined level. To reduce the total amount of the culture fluid required in growing the plants, the fluid level is preferably selected as shallow as possible. The bottom wall 30 has a through-hole 38 at its center so that a conduit 40 described below may pass therethrough, with a rubber seal 42 inserted around the conduit 40.

The support flange member 28 includes a canted flange 44 extending downwardly outwardly from its proximal end and coming into contact with the flared rim 16 of the reservoir 10 at its free end. The flange 44 has a plurality of plant holding apertures 46 formed through the thickness thereof. A plant seed or young plant may be implanted into each of the plant holding apertures 46 by using a piece of soft, porous, spongy material 48. It is preferable that at least one fluid communication hole 50 be formed through the flange 44 to enable the culture fluid dispensed from the basin-like body 26 to enter the reservoir 10. Further, the support flange member 28 has a through-hole 52 at its central region, which coincides with that of the basin-like body 26.

A second cultivation bed 54 that consists of a basin-like body 56 and a support flange member 58 is placed on the first cultivation bed 24. Since the second cultivation bed 54 does not differ structurally from the first cultivation bed 24, no further description will be needed in this connection. Lying on the top of the second cultivation bed 54 is a top flange member 60 which has substantially the same structure as the support flange member 28 of the first cultivation bed 24.

While the hydroponic device is shown in FIGS. 1 and 2 to have two cultivation beds, the exact number of the cultivation beds may be either reduced or increased depending upon the user's desire. In addition, the cultivation beds may have a circular configuration rather than a rectangular shape as illustrated in FIG. 1. To facilitate transmission of the sun light or artificial my through the hydroponic device, the cultivation beds 24, 54 and the top flange member 60 are preferably made of transparent synthetic resin. A fluid pump 62 is fixedly mounted on the bottom wall 12 of the reservoir 10 in order to forcedly circulate the culture fluid gathered in the reservoir 10 through the conduit 40.

Figure 3:
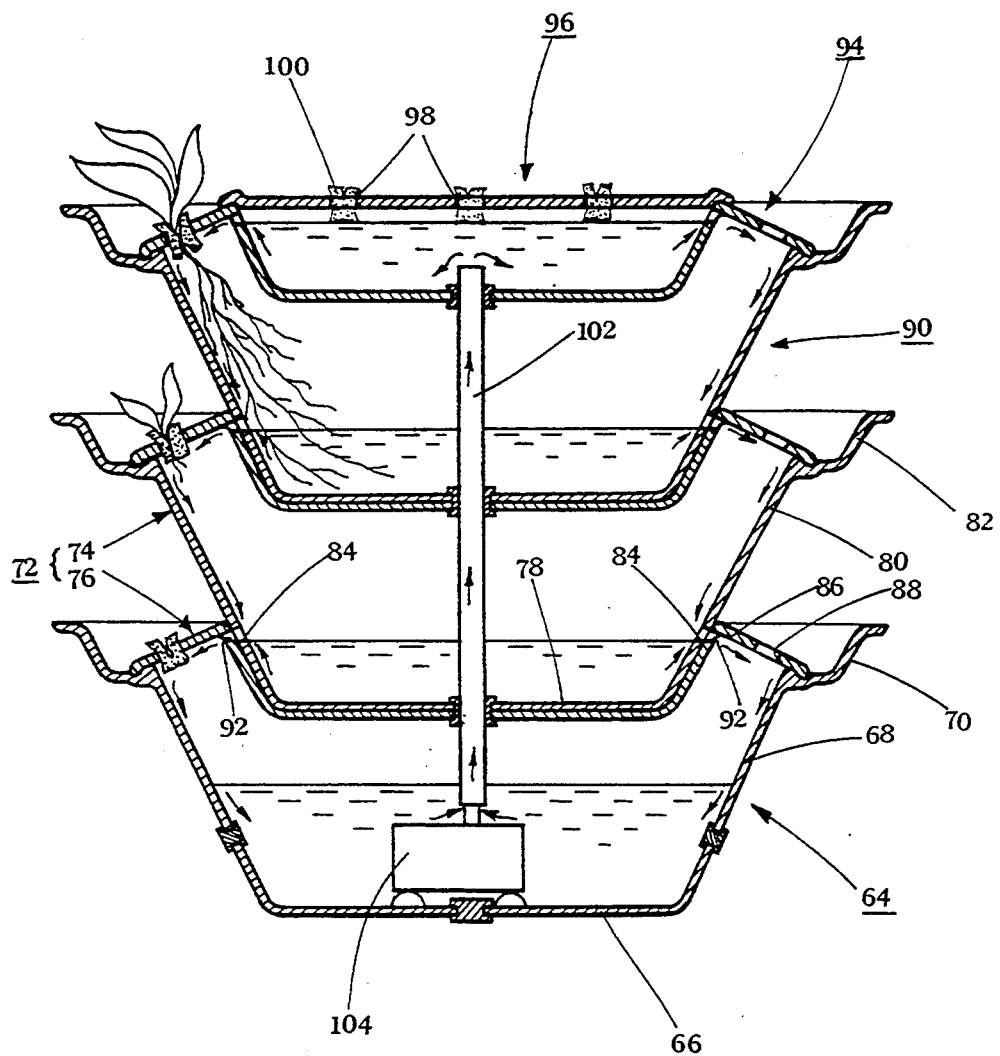
FIG. 3 is a view similar to FIG. 2 but showing a first modification of the hydroponic device.

FIG. 3 shows a first, modified embodiment of the inventive hydroponic device which includes a reservoir 64 for containment of the culture fluid. The reservoir 64 is provided with a horizontal bottom wall 66 and a sloped side wall 68 which extends upwardly outwardly from the bottom wall 66. The side wall 68 terminates at a flared rim 70.

As described above with reference to FIGS. 1 and 2, the reservoir 64 is adapted to hold a sufficient amount of culture fluid or solution which may contain nutritive substances, e.g., chemical fertilizer.

Located immediately above the reservoir 64 is a first cultivation bed, generally designated at 72, which consists of basin-like body or receptacle 74 and a support flange member 76 mold separately from the basin-like body 74. Like the reservoir 64 explained above, the body 74 is provided with a horizontal bottom wall 78 and a sloped side wall 80 which extends upwardly outwardly from the bottom wall 78. The side wall 80 may extend at an angle of, e.g., 60 degrees with respect to the bottom wall 78 and terminates at a flared rim 82. Formed through the side wall 80 are a plurality of fluid outlet holes 84 through which the culture fluid may overflow. It is desirable to locate the fluid outlet holes 84 at a position of the side wall 80 near to the bottom wall 78, thus keeping the level of the culture fluid collected in the body 74 as shallow as possible.

The flange member 76 serves to support thereon the basin-like body 74 and includes a canted flange 86 which extends downwardly outwardly toward the flared rim 70 of the reservoir 64. The flange 86 has a plurality of plant holding apertures 88 that may anchor plant seeds or young plants by using a piece of porous, spongy material 90. It should be noted that the flange 86 has fluid passage holes 92, each corresponding to and accurately coinciding with the fluid outlet holes 84 of the basin-like body 74. The fluid outlet holes 84 and the fluid passage holes 92 are all positioned immediately below the flange 86 to ensure that the culture fluid issued therethrough may flow along the lower surface of the flange 86 toward the plant holding apertures 88. This will assist in keeping the culture fluid out of contact with the ambient air to minimize unwanted vaporization of the fluid.

A second cultivation bed 90 is placed on the first cultivation bed 72 to form a multistory plant growing structure. Since the second cultivation bed 90 does not differ in structure from the first cultivation bed 72, no further explanation will be needed in connection therewith. Located on the top of the second cultivation bed 90 is a top flange member 94 which has substantially the same configuration as the support flange member 76 of the first cultivation bed 72 set forth hereinabove. Additionally, a cover plate 96 is located on the top flange 94, which has a number of plant holding apertures 98 each closed by a porous spongy piece 100.

Figure 4:
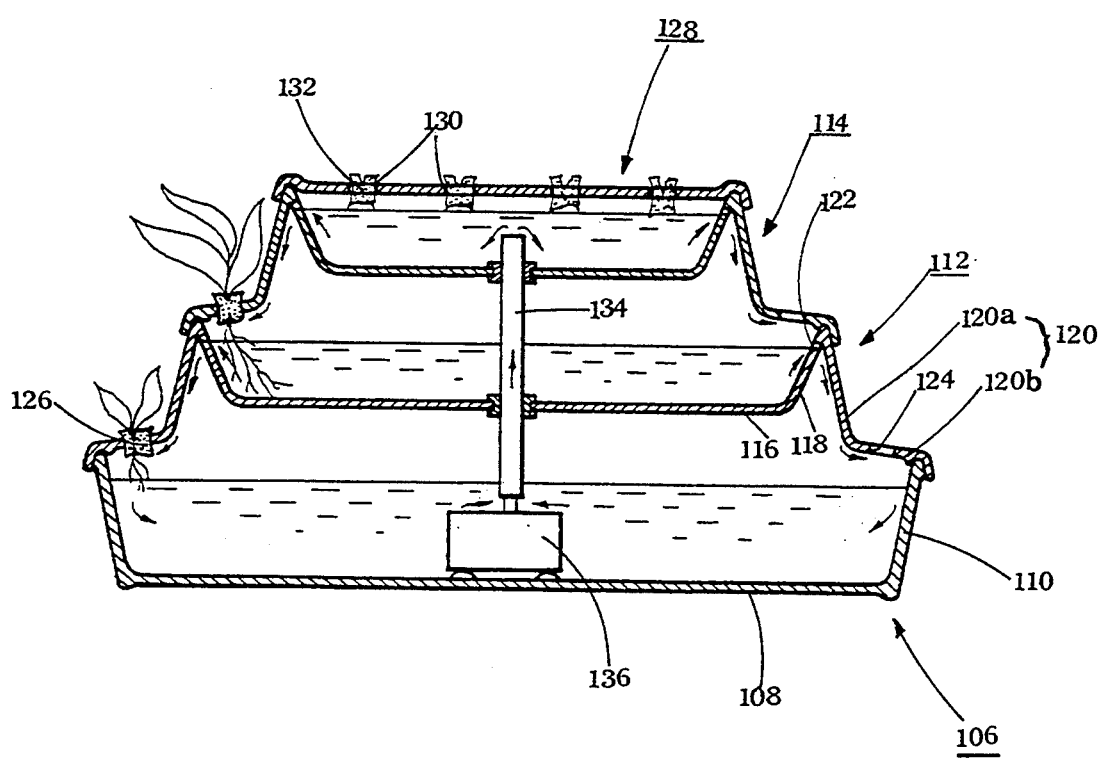
FIG. 4 illustrates, in cross-section, a second modification of the hydroponic device shown in FIGS. 1 and 2.

An upright conduit 102 extends through the first cultivation bed 72, the second cultivation bed 90 and the top flange member 94. A conventional fluid pump 104 is employed to forcedly circulate the culture fluid through the conduit 102. Referring finally to FIG. 4, them is shown a second modified embodiment of the novel hydroponic device that includes a reservoir 106 for containing an adequate level of culture fluid. The reservoir 106 is provided with a horizontal bottom wall 108 and a side wall 110 which extends upwardly outwardly a relatively short distance from the bottom wall 108. A first and a second cultivation bed 112, 114 are located, one above the other, on the reservoir 106 to form a generally pyramidic water culture device.

As shown, each of the first and the second cultivation beds 112, 114 include a bottom wall 116, a side wall 118 extending upwardly outwardly from the bottom wall 116 and a flange 120 integrally molded with the side wall 118. The side wall 118 has a plurality of fluid outlet holes 122 formed in close proximity to the proximal end of the flange 120. It will be appreciated that the flange 120 consists of a steep slope portion 120a and a slight slope portion 120b smoothly connected with each other. A plurality of plant holding apertures 124 are formed through the thickness of the slight slope portion 120b to anchor plant seeds or young plants with a porous spongy piece 126.

A cover plate 128 is located on the second cultivation bed 114, which has a series of plant holding apertures 130 each closed by means of a plant-carrying porous spongy piece 132. Furthermore, an upright conduit 134 extends through the first and the second cultivation beds 112, 114, to raise the culture fluid up to the second cultivation bed 114. It is possible to use a conventional fluid pump 136 in forcedly circulating the culture fluid via the conduit 134.

While a preferred embodiment has been described with reference to the drawings, variations thereto well occur to those saddled in the art within the scope of the present inventive concepts which are delineated by the following claims.

What is claimed is:

1. A hydroponic device adapted to grow plants through the use of circulative culture fluid, comprising:
    a reservoir placed at a lowermost position of said hydroponic device for containing the culture fluid therein;
    one or more cultivation beds lying on said reservoir one above another, each of said beds including a basin-like body which is provided with a horizontally extending bottom wall and an inclined side wall extending upwardly outwardly from the bottom wall, said side wall having a plurality of fluid outlet holes each arranged at such an elevation as to permit the culture fluid gathered in said body to overflow therethrough;
    each of said cultivation beds further including a canted support flange which extends downwardly outwardly from the side wall of said body, said flange having a plurality of plant holding apertures each capable of anchoring the plants in place, said fluid outlet holes being at a position of the side wall such that the culture fluid issued therethrough can flow down along the support flange to reach the corresponding plant holding apertures, said inclined side wall and said canted flange cooperating with each other to allow the plants held in the plant holding apertures to grow straight along said side wall;
    a conduit extending vertically upwardly from said reservoir through the bottom wall of said basin-like body up to an uppermost cultivation bed; and
    a fluid pump mounted on said reservoir for forcedly feeding the culture fluid to said uppermost cultivation bed through said conduit.

2. The hydroponic device as recited in claim 1, further comprising a top cover plate having an army of substantially evenly spaced plant holding apertures.

3. The hydroponic device as recited in claim 1, wherein said flange is physically separated from said body.

4. The hydroponic device as recited in claim 1, wherein said flange is integrally molded with said body.

5. The hydroponic device as recited in claim 3, wherein said fluid outlet holes are formed through the side wall of said basin-like body at a position immediately above said flange to thereby allow the culture fluid issued from said outlet holes to flow down along an upper surface of said flange toward the plant holding apertures.

6. The hydroponic device as recited in claim 3, wherein said fluid outlet holes are formed through the side wall of said basin-like body at a position immediately below said flange to thereby allow the culture fluid issued from said outlet holes to flow down along a lower surface of said flange toward the plant holding apertures.

7. The hydroponic device as recited in claim 1, wherein said cultivation beds are made of transit synthetic resin.

* * * * *